Dec. 16, 1941.  J. E. GANOE  2,266,189

EXTRUSION DIE STRUCTURE

Filed July 16, 1940

INVENTOR
John E. Ganoe
BY
S. Ernest Low.
ATTORNEY

Patented Dec. 16, 1941

2,266,189

UNITED STATES PATENT OFFICE 2,266,189

EXTRUSION DIE STRUCTURE

John E. Ganoe, New Kensington, Pa., assignor to Aluminum Company of America, Pittsburgh, Pa., a corporation of Pennsylvania Application July 16, 1940, Serial No. 345,748

4 Claims. (Cl. 207—17)

The present invention relates in general to improvements in extrusion and is particularly directed to an extrusion die or tool assembly for the production of extruded shapes or sections from unperforated billets or metal charges. The extruded shapes or sections, which the tools and mechanism of this invention are preferably adapted to produce, are, in general, seamless tubular sections, or substantially hollow sections having their otherwise continuous walls interrupted along a line in their periphery.

In the production of substantially tubular extruded shapes or sections, it is well-known to employ what are commonly termed "porthole" extrusion die assemblies. Such porthole die assemblies or structures normally comprise a front male or mandrel die and a back female or exterior contour-controlling die, so arranged that the metal of an unperforated billet, or solid metal charge, divides itself under the influence of pressure into one or more streams of metal which flow through the front die and around the mandrel where it coalesces in a mixing or welding chamber adjacent the entrance to a die orifice. Continued extrusion pressure causes the metal to be forced out of the mixing or welding chamber and to be extruded through the die orifice, which is defined between an aperture in the female die and the mandrel, to produce a substantially tubular extruded section. It will be appreciated that extrusion die assemblies of this general type have eliminated the necessity of using perforated or hollow metal billets in the production of tubular shapes, and for this reason porthole type die assemblies have found ready acceptance in the extrusion art.

In general, the known types of porthole extrusion dies have certain inherent structural characteristics, which contribute largely to the development of excessive pressures during their use, and which often result in heavy die breakage with its attendant high operating maintenance. These pressures differ for different metals and alloys, and are particularly noticeable at the beginning of an extrusion operation, as distinguished from the pressures experienced after the metal of a solid billet has begun to flow under the continued applied extrusion force. No attempt is herein made to explain all of the factors contributing to the excessive pressures herein referred to, which for high strength aluminum alloys often initially reach 150,000 pounds per square inch, or higher, adjacent the extrusion dies. These excessive pressures are, however, known to bear a definite relationship to the ratio of the perimeter of an extruded shape or section to its metal volume; to non-symmetry of configuration of the extruded shape; and to the general design of the porthole extrusion dies, including the cross-sectional area and shape of the metal-flow passages. Of these variables, the latter is usually the only factor over which a tool designer or operator has any control for any given extruded shape or section, and it is to this end that the present invention is primarily directed.

Investigation of commercially known types of porthole extrusion dies has shown that these dies in general can only be employed in extrusion operations when the extrusion pressures adjacent the dies are maintained at substantially 100,000 pounds per square inch, or under. In fact, maximum pressure of 100,000 pounds per square inch was only possible following particular design of metal-flow passage, or passages, through the front or male die to minimize losses resulting from frictional resistance, and to reduce to a minimum abrupt changes in direction of the flow of metal through such dies. With the die structures of the present invention it has been possible to take advantage of all of the favorable characteristics of presently used porthole extrusion dies, and, in addition, provide an extrusion die structure which is greatly increased in strength to the extent that extrusion pressures of 150,000 pounds per square inch and over, adjacent the dies, can be readily handled without necessitating the redesign of presently used and available equipment customarily associated with extrusion dies.

It is an object of the present invention to provide a porthole type of die assembly which has all of the advantages of present dies of this general class, but which also incorporates improved and superior features of construction. A further object of the invention is to provide a porthole extrusion die of sturdy and rigid construction in which means are incorporated for meeting and alleviating the excessive pressures now experienced in dies of this general type. Another object of the invention is to provide a porthole extrusion die assembly of compact construction which is readily adaptable to presently employed types of standard extrusion presses and equipment, and which is readily disassembled on completion of an extrusion run, as for replacement of the dies, or for any other purpose.

Other objects and advantages of this invention will present themselves on consideration of the following specification when read in conjunction with the drawings appended hereto and forming a part hereof, in which.

Figures 1, 2:
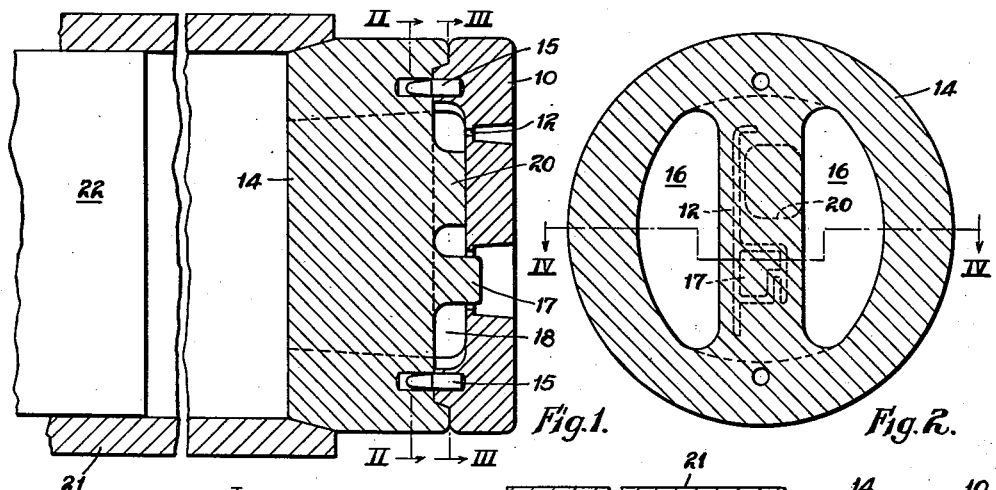
Fig. 1 represents a sectional elevation taken along the line I—I of Fig. 3 and disclosing an extrusion die assembly in association with fragmentary portions of a cooperating extrusion billet cylinder and ram.
Fig. 2 represents a sectional view taken along the line II—II of Fig. 1.

Present practice in the construction of porthole extrusion dies is to use the largest possible port opening or openings through the male die for a given size of die blank. The number of ports normally depends upon the shape of the section to be extruded, the requirement being that the section to be extruded should be uniformly filled over its entire cross-section. It will be manifest that the excessive pressures developed during an extrusion operation will greatly control the size of the porthole openings through any given die in that sufficient web metal must remain to withstand the pressures developed during an extrusion operation.

It has been discovered that increased strength and rigidity can be imparted to known types of porthole extrusion dies by providing means for increasing columnar resistance between the front and back dies, whereby the applied loading on the die assembly is transmitted through the normal annular outer bearing portions of a front and back die assembled in abutting relationship, as well as through the web or bridge portions supporting the mandrel, to the back or female die. This applied loading exerted on the female die is normally resisted by a rigid portion of an extrusion press, such as the press platen. When it is considered that in known types of porthole dies the mandrel is actually supported by bridges or webs, each of which reacts substantially as a cantilever beam, absence of the additional columnar support or means of this invention permitted noticeable deflection of the bridge or web metal with the result that this deflection brought about correspondingly high values of stress which in many instances were greater than available die materials could withstand without fracture. The tool design of this invention has been found in practice to add increased strength and rigidity to porthole type extrusion dies and has greatly increased the useful life of such extrusion dies without in any way interfering with their productive capacity.

Referring now to the drawing, wherein like reference numerals represent similar parts in all views, the preferred form of porthole die assembly of this invention comprises a female or back die member 10 which is provided with an aperture 12 which defines the exterior configuration of the extruded shape to be produced. A male or front die 14 is disposed in abutting relationship with the front face of the back or rear die 10 and is preferably held in registry therewith by means of suitable dowel pins 15. The front die 14 is provided with one or more metal conducting passages 16 extending through the same, and supports a mandrel member 17 in cooperative extending relationship with the aforementioned aperture 12 in the back die. The mandrel 17 is preferably formed integral with the die member 14.

The abutting faces of the front and back dies 14 and 10, respectively, are preferably substantially flat, and normally constitute marginal or annular portions of these two dies disposed in columnar bearing relationship. The abutting faces of dies 10 and 14 cooperate to form or provide therebetween a mixing or welding chamber 18. It will be manifest that chamber 18 may be formed by cooperating recesses in both dies, or be confined entirely to a recess within either one of the dies.

Figures 3, 4:
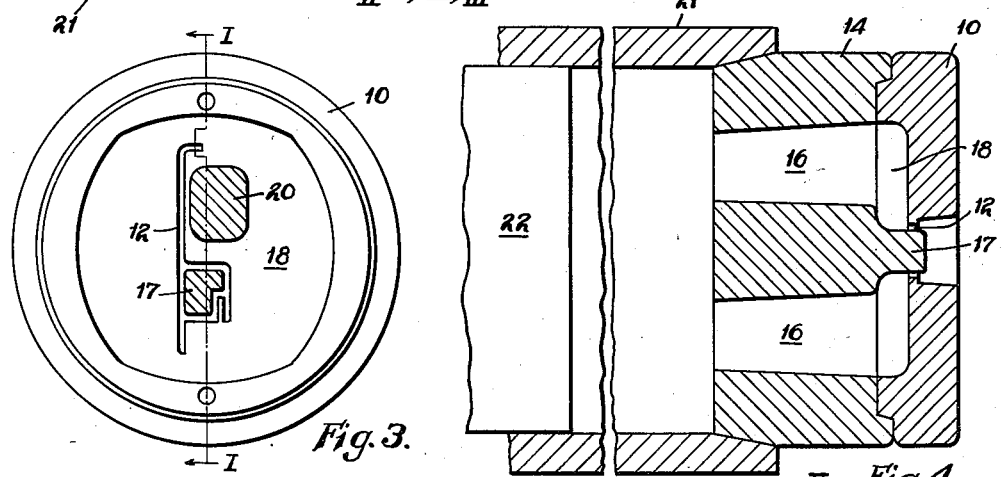
Fig. 3 represents a sectional view taken along the line III—III of Fig. 1.
Fig. 4 represents a sectional view taken along the line IV—IV of Fig 2 and disclosing fragmentary portions of the cooperating extrusion billet cylinder and ram.

One or more passages 16 (Fig. 4) terminate in the mixing chamber 18, and to impart additional strength and rigidity to the die structure one or more projections or protuberances 20 are disposed within the chamber 18 in abutting relationship with both of the dies 10 and 14. The protuberances 20 are in addition to the normally provided abutting portions of dies 10 and 14 and are preferably disposed radially inwardly of a line circumscribing the most outwardly disposed wall or walls of the passages 16 through the male die member, the circumscribing line normally defining the outer wall of the mixing chamber 18. Although the abutment or protuberance 20 of the die structure illustrated in Figs. 1 through 4 has been disclosed as an integral part of die member 14 (the front die), it will be appreciated that the protuberance, or protuberances, could be a separate insert, or could be an integral portion of the back die 10.

In Fig. 1 the assembled dies 10 and 14 are illustrated in cooperative relationship with an extrusion billet cylinder 21 and ram 22. In the practice of the invention an unperforated billet is placed within the billet cylinder 21 and pressure is exerted thereon through the medium of the ram 22. The metal of the billet under the aforementioned extrusion pressure divides itself into separate streams of metal depending upon the number of passages through the male die 14, the stream or streams being collected within the mixing chamber 18 from which they are extruded through the die orifice, formed by the cooperation of the die aperture 12 with the mandrel 17, to produce the desired extruded shape.

Figures 5, 6, 7:
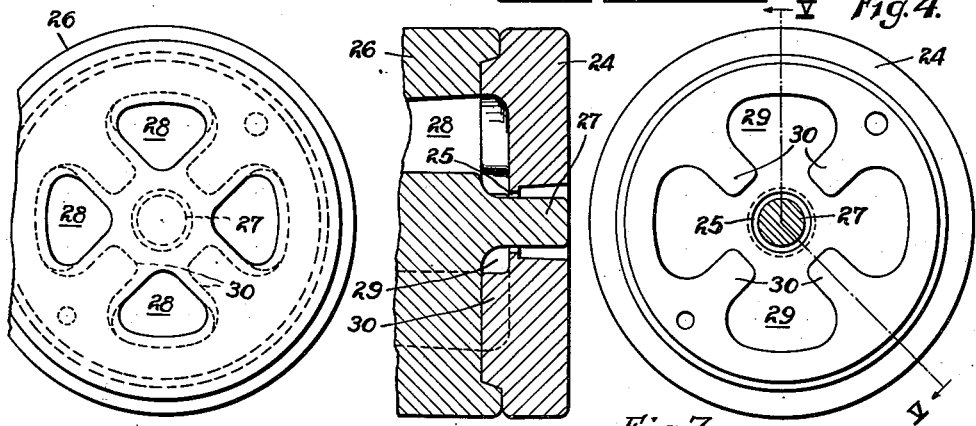
Fig. 5 represents a fragmentary sectional elevation through a pair of cooperating male and female extrusion dies illustrating a further embodiment of the invention, the section being taken in the direction of the arrows V—V of Fig. 7.
Fig. 6 represents a front elevational view of the male die as viewed from the right of Fig. 5.
Fig. 7 represents a front view of the female die illustrated in Fig. 5, the cooperating mandrel of the male die being shown in section to more clearly illustrate the tool construction.

In Figs. 5, 6, and 7, extrusion tools of the porthole type, and incorporating the present invention, are illustrated. In these illustrations a back die 24 is disclosed for the production of seamless hollow tubing, the aperture 25 in this die being substantially circular. The front die 26, which is assembled in cooperative abutting relationship with the back die 24, supports a cylindrical mandrel 27 extending into the aforementioned die aperture 25. The front die 26 is also preferably provided with four radially disposed, similarly shaped metal-flow passages 28 which terminate in a mixing chamber 29 formed between the abutting dies 24 and 26.

Extending radially inwardly from a line circumscribing the outer walls of the passages 28 are four protuberances 30 which are disposed within the mixing chamber 29. It will be seen that the protuberances 30 are disposed between adjacent passages 28 and serve to place the front and back dies 26 and 24, respectively, in columnar bearing relationship at a plurality of points within the mixing chamber 29.

It will be understood that the die structure, illustrated in Figs. 5 through 7, functions in cooperative relationship with an extrusion billet cylinder and ram in the same manner as the tools illustrated in Figs. 1 through 4, previously described.

Although the invention hereinabove has been described with reference to two specific tool assemblies, it is to be understood that the invention is susceptible of a wide variety of uses in the production of extruded products from various ferrous or non-ferrous metals and their alloys, and the invention is not to be limited thereto except as defined in the appended claims.

What is claimed is:

1. An extrusion die structure for production of seamless hollow shapes from unperforated charges comprising a mandrel-supporting die and a cooperating female die, said mandrel extending into an aperture in the female die, said dies being disposed in abutting columnar bearing relationship over marginal portions of their abutting faces and cooperating to provide a mixing chamber surrounding the mandrel, additional columnar bearing in resistance to extrusion pressure between said dies in the form of a protuberance disposed radially inwardly of said marginal abutting faces, and said protuberance being entirely within the mixing chamber and spaced radially outwardly from the female die aperture.

2. An extrusion die structure for production of seamless hollow shapes from unperforated charges comprising, in combination, a male or front die member, and a female or back die member, said male die having at least one passage extending therethrough, a mandrel supported by said male die and extending into a die aperture in the female die, said mandrel and die aperture cooperating to define therebetween a die orifice adapted to control the cross-section of an extruded shape, a mixing chamber forwardly of the die aperture, said passage through the male die terminating in said mixing chamber, and said chamber being interrupted by an abutment which serves to place the male and female dies in columnar relationship in resistance to extrusion pressure, said abutment being disposed inwardly of a line circumscribing an outer wall of the passage through the male die and spaced outwardly from the female die aperture.

3. In an extrusion die structure for production of seamless hollow shapes from unperforated billets, the combination of a front mandrel-supporting die member, a back exterior contour-controlling female die member, said front and back die members being operatively assembled with a marginal portion of each in abutting columnar relationship, a plurality of passages through said front die member terminating in a mixing chamber adjacent a die orifice formed between a mandrel carried by the front die member and an aperture in said back die member, said mixing chamber having an enclosing wall portion defined by a line circumscribing the walls of the passages furthest removed from the major axis of the mandrel at their points of juncture with the mixing chamber, and at least one abutment within said mixing chamber adapted to place said front and back die members in columnar bearing relationship in resistance to extrusion pressure in addition to the said marginal abutting columnar relationship, said abutment being disposed entirely within the circumscribing line defining the enclosing wall portion of the mixing chamber and spaced outwardly from the back die aperture.

4. In an extrusion die structure for production of hollow seamless shapes from unperforated charges, the combination of a front mandrel-supporting die member, a back exterior contour-controlling female die member, said front and back die members being operatively assembled with a marginal portion of each in abutting columnar relationship, a plurality of passages through said front die member terminating in a mixing chamber adjacent a die orifice formed between a mandrel carried by the front die member and an aperture in said back die member, said mixing chamber having an enclosing wall portion defined by a line circumscribing the walls of the passages furthest removed from the major axis of the mandrel at their points of juncture with the mixing chamber, and a plurality of abutments between said passages, said abutments being disposed within said mixing chamber and adapted to place said front and back die members in columnar bearing relationship in resistance to extrusion pressure in addition to the said marginal abutting columnar relationship, said abutments being disposed entirely within the circumscribing line defining the enclosing wall portion of the mixing chamber and spaced outwardly from the aperture in the back die member.

JOHN E. GANOE.